United States Patent
Kuang et al.

(10) Patent No.: US 8,114,318 B2
(45) Date of Patent: Feb. 14, 2012

(54) IONIC LIQUID ELECTROLYTE

(75) Inventors: Daibin Kuang, Lausanne (CH); Peng Wang, Cambridge (GB); Shaik Mohammad Zakeeruddin, Renens (CH); Michaël Graetzel, St-Sulpice (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 648 days.

(21) Appl. No.: 12/223,937

(22) PCT Filed: Feb. 13, 2007

(86) PCT No.: PCT/IB2007/050472
§ 371 (c)(1),
(2), (4) Date: Aug. 12, 2008

(87) PCT Pub. No.: WO2007/093961
PCT Pub. Date: Aug. 23, 2007

(65) Prior Publication Data
US 2010/0229950 A1    Sep. 16, 2010

(30) Foreign Application Priority Data
Feb. 13, 2006 (EP) .................... 06101577

(51) Int. Cl.
*H01B 3/20* (2006.01)
(52) U.S. Cl. ....... 252/580; 252/62.2; 252/574; 252/575; 136/244; 136/254; 136/256; 136/263; 423/372
(58) Field of Classification Search ............. 252/62.2, 252/500, 574, 575, 580; 136/256, 263, 244; 136/254; 423/372
See application file for complete search history.

(56) References Cited

U.S. PATENT DOCUMENTS

| | | | |
|---|---|---|---|
| 6,426,827 B1 | 7/2002 | Bonhote et al. | |
| 6,586,670 B2 | 7/2003 | Yoshikawa | |
| 6,861,722 B2 * | 3/2005 | Graetzel et al. | 257/461 |
| 7,110,243 B2 | 9/2006 | Kawata et al. | |
| 7,645,434 B2 * | 1/2010 | Welz-Biermann et al. | 423/377 |
| 2004/0040728 A1 * | 3/2004 | Shotton | 173/152 |
| 2004/0163700 A1 | 8/2004 | Mizuta et al. | |
| 2004/0238826 A1 | 12/2004 | Sekiguchi et al. | |
| 2006/0005877 A1 * | 1/2006 | Spivack et al. | 136/263 |

(Continued)

FOREIGN PATENT DOCUMENTS
DE    10306617    8/2004
(Continued)

OTHER PUBLICATIONS
P. Wang et al., "A Binary Ionic Liquid Electrolyte to Achieve great than or equal 7% Power Conversion Efficiencies in Dye-Sensitized Solar Cells", Chem. Mater., 2004, 16, 2694-2696.*

(Continued)

*Primary Examiner* — Khanh Tuan Nguyen
(74) *Attorney, Agent, or Firm* — Clifford W. Browning; Krieg DeVault LLP

(57) ABSTRACT

The present invention relates to electrolytes comprising tetracyanoborate and an organic cation as components of electrolytes in electrochemical and/or optoelectronic devices, in particular solar cells. This ionic liquid has low viscosity and can be used as electrolyte in the absence of a solvent. Importantly, the ionic liquid remains stable in solar cells even after prolonged thermal stress at 80° C. for 1000 hours. Photovoltaic conversion efficiency remained stable and keeping more than 90% of the initial value.

17 Claims, 4 Drawing Sheets

U.S. PATENT DOCUMENTS

2006/0222584 A1   10/2006   Welz-Biermann et al.

FOREIGN PATENT DOCUMENTS

| | | |
|---|---|---|
| EP | 0986079 | 3/2000 |
| EP | 1 365 463 A2 | 11/2003 |
| JP | 2006-202646 | 8/2006 |
| JP | 2006-344433 | 12/2006 |
| WO | WO 2004072089 A1 * | 8/2004 |
| WO | WO 2004/106287 | 12/2004 |
| WO | WO 2004/106288 | 12/2004 |
| WO | WO 2005063773 A1 * | 7/2005 |
| WO | WO 2005/109562 A1 | 11/2005 |

OTHER PUBLICATIONS

P. Wang et al., "Charge Separation and Efficient Light Energy Conversion in Sensitized Mesoscopic Solar Cells Based on Binary Ionic Liquids", J.Am.Chem.Sco., 2005, 127, 6850-6856.*

* cited by examiner

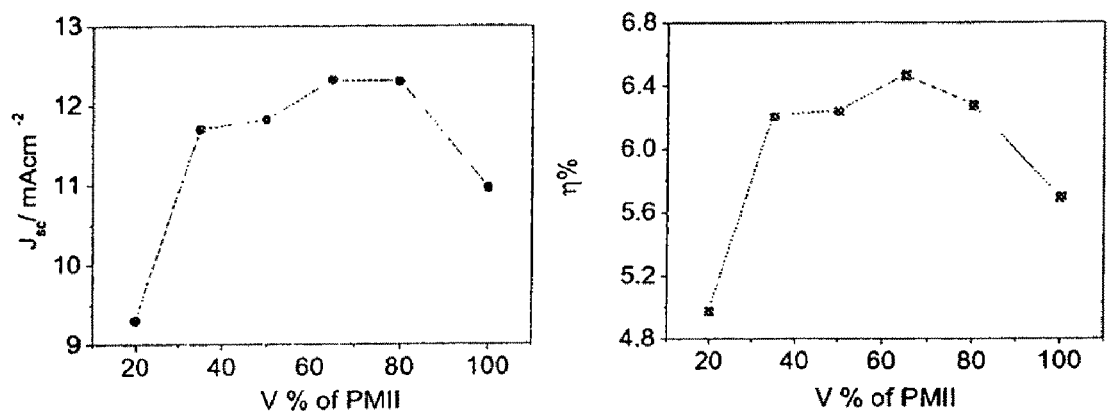
Figure 6 A and B

IONIC LIQUID ELECTROLYTE

This application claims the benefits under 35 U.S.C. 119 (a)-(d) or (b), or 365(b) of International Application No. PCT/IB2007/050472 filed 13 Feb. 2007, and European Patent Application No. 06101577.2 filed 13 Feb. 2006.

The present invention relates to electrochemical and/or optoelectronic devices, to new electrolytes, to the use of a ionic liquid in such a device and to a method for preparing a photoelectric cell.

BACKGROUND ART AND PROBLEM TO BE SOLVED

Electrolytes form a crucial part of electrochemical and/or optoelectronic devices and performance of the device largely depends on the physical and chemical properties of the various components of these electrolytes.

Amongst solar cells, those sensitised with a dye or quantum dots for example, have been paid intensive attentions in the last 15 years as an alternative to silicon technology and progresses have been made in the development of efficient dyes, electrolytes and $TiO_2$ films to enhance the device performance.

Encapsulation and leakage of high vapor pressure organic solvents based electrolytes is a major challenge for the commercialization of many electrochemical and/or optoelectronic devices and in particular sensitized solar cells. Room temperature ionic liquids are attractive candidates to replace volatile organic solvents present in such devices due to their negligible vapor pressure and high ionic conductivity.

Imidazolium iodide ionic liquids, for example, are very viscous and the high concentration of iodide ions in these electrolytes creates a loss channel through reductive quenching of the excited sensitizer, hampering device performance. Use of binary ionic liquid electrolytes for sensitized solar cells reduces both the viscosity of the electrolyte and the reductive quenching effect. Various binary ionic liquid electrolytes have recently been applied to dye-sensitised solar cells reaching over 7.0% photovoltaic conversion efficiency with a good stability under accelerated light soaking tests at 60° C. However, the drawback of the anions thiocyanate, selenocyanate, dicyanamide and tricyanomethanide that have been used along with iodide to attain such an impressive performance is their thermal instability resulting in photovoltaic performance loss under prolonged thermal stress at 80° C.

In view of the above, it is an objective of the present invention to provide electrolytes for electrochemical and/or optoelectronic devices that may lead to improved performance of these devices. Furthermore, it is an objective to increase thermal stability of such devices and in particular sensitised solar cells.

It is a further objective to reduce the quantity of iodide ions in electrochemical and/or optoelectronic devices. Disadvantages of iodide ions are, for example, the high viscosity and low efficiency of electrolytes containing them.

It is a more general objective of the present invention to provide new electrolytes or new electrolyte components that can be advantageously used in these devices. Ionic liquids with negligible vapour pressure are known as "green solvents" due to their non-toxicity. It is thus an objective of the invention to use them as electrolytes in optoelectronic devices to make them environmentally friendly.

SUMMARY OF THE INVENTION

Surprisingly, the present inventors found that a ionic liquid based on a tetracyanoborate anion and an organic cation improve performance and stability of electrochemical and/or optoelectronic devices and in particular of sensitised solar cells. For the first time, in dye-sensitised solar cells using electrolytes comprising this ionic liquid, photovoltaic efficiency retained more than 90% of the initial value even after 1000 hours aging at 80° C. and light soaking at 60° C. These remarkable improvements solve problems linked to the above objectives and will foster industrial applications where one can use only ionic liquids electrolytes.

Accordingly, in a first aspect, the present invention provides an electrochemical and/or optoelectronic device comprising an electrolyte comprising an ionic liquid of $Kt^+[B(CN)_4]^-$ (formula (I)), in which $Kt^+$ is an organic cation.

In a further aspect, the present invention provides an electrolyte comprising an ionic liquid of formula I and at least one further ionic liquid.

In another aspect, the present invention provides a use of the ionic liquid of the invention in an electrochemical and/or optoelectronic device.

In still a further aspect, the present invention provides a method of preparing a photoelectric cell, the method comprising the step of bringing the elecrolyte and/or the ionic liquid of the invention in contact with a surface of a semiconductor, said surface optionally being coated with a sensitiser.

BRIEF DESCRIPTION OF THE DRAWINGS

FIGS. 6 A and B show the change in the short circuit current ($J_{SC}$/$mAcm^{-2}$) and photovoltaic conversion efficiency ($\eta$), respectively, of dye sensitized solar cells containing different ratios of PMII and $EMIB(CN)_4$ ionic liquid in the electrolyte in combination with Z 907Na dye.

DETAILED DESCRIPTION OF THE PREFERRED EMBODIMENTS

Figure 1:
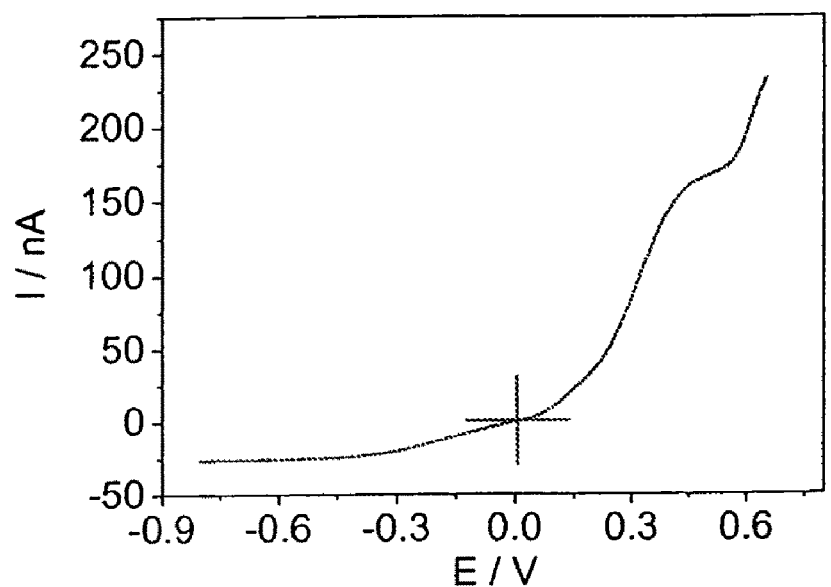
FIG. 1 shows a steady-state voltammetry curve for an electrolyte according to the invention PMII (1-propyl-3-methylimidazolium iodide) and $EMI[B(CN)_4]$ (1-ethyl-3-methylimidazolium tetracyanoborate) v:v=13:7) at the scan rate of 20 $mVS^{-1}$. The diffusion rate of triiodide is 1.8 times higher than that in pure PMII based electrolyte.

The present invention relates to electrochemical and/or optoelectronic devices. Electrochemical devices are devices in which electric and chemical phenomena interact or interconvert. Examples are devices, in which transport of charge is associated with or accompanied by a redox-reaction. In general, electrochemical devices are devices comprising at least one electrode at which a capacitive charging process and/or an oxido-reductive process takes place. In general, an electrochemical device is a device in which a capacitive charging process or chemical reactions take place due to external voltage, or voltage is created due to a chemical reaction.

Optoelectronic devices are devices that imply or manage the conversion of optical-to-electrical energy.

The word "comprise" or "comprising", for the purpose of the present invention is intended to mean "including amongst other". It is not intended to mean "consisting only of".

An electrolyte is an electrically conductive medium, basically due to the presence of at least one substance that is present in a dissolved and/or molten state and thus dissociated in free ions.

Liquid, in the term "ionic liquid", for the purpose of the present invention, is a substance and/or composition having a melting point at 100° C. or lower. Preferably, Any ionic liquid mentioned herein, in particular the ionic liquid according to formula (I), independently has preferably a melting point of ≦50° C., more preferably ≦35° C. and most preferably ≦25° C. Accordingly, the ionic liquids that may be used as part of the present invention preferably are room temperature (25° C.) molten ionic liquids. Preferably, the optional at least one further ionic liquid of the electrolyte of the present invention is a RT molten liquid.

The present invention makes use of a ionic liquid of formula I (Kt$^+$[B(CN)$_4$]$^-$), in which [B(CN)$_4$]$^-$ is tetracyanoborate and Kt$^+$ is an organic cation. Kt$^+$ carries at least one positive charge. Preferably it carries one positive charge.

Examples of compounds of formula (I) have been disclosed in the literature, namely in WO 2004/072089, page 18, Example 9.

In a preferred embodiment, the organic cation Kt$^+$ is a hydrocarbon comprising at least one charged atom selected from the group of N$^+$, P$^+$, C$^+$, S$^+$, and combinations thereof. For example, the organic cation may comprise at least one quaternary nitrogen, quaternary phosphorous, ternary sulfur, a carbocation, and combinations thereof.

The hydrocarbon Kt$^+$ preferably comprises from 1-30, preferably 2-20 carbon atoms and may be linear, cyclic and/or branched, it may comprise one or several heteroatoms and it may be substituted.

Heteroatoms are preferably selected from N, O, P, S and combinations thereof.

Substituents of the hydrocarbon may be selected from substituents R defined further below.

Preferably, Kt$^+$ comprises a cyclic, 5 and/or 6-membered ring, comprising one or several heteroatoms as defined above, the ring optionally comprising 1-5 or 6, respectively, substituents R as defined below. Preferably, Kt$^+$ comprises 1 or 2 N-hetero atoms. More preferably, at least one N-hetero atom present in the ring is substituted by R as defined below.

In a preferred embodiment, the organic cation Kt$^+$ of the ionic liquid is selected from the group

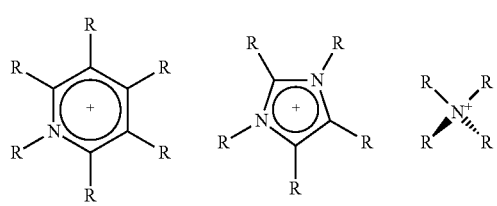

-continued with R being:
  H, provided that at least one R linked to a heteroatom is different from H;
  a linear or branched C1-C20 alkyl;
  a linear or branched C2-C20 alkenyl, comprising one or several double bonds;
  a linear or branched C2-C20 alkynyl, comprising one or several triple bonds;
  a saturated, partially or totally unsaturated C3-C7 cycloalkyl;
  a halogen, preferably fluoride or chloride, provided that there is no halogen-heteroatom bond;
  NO$_2$, provided that there is no bond of this group with a positively charged heteroatom, and that at least one R is different from NO$_2$;
  CN, provided that there is no bond of this group with a positively charged heteroatom and that at least one R is different from CN;
  wherein the R may be the same or different;
  wherein pairs of R may be connected by single or double bonds;
  wherein one or several R may be partially or totally substituted with halogens, preferably —F and/or —Cl, or partially with —CN or —NO$_2$, provided that not all R are totally halogenated;
and wherein one or two carbon atoms of any R may or may not be replaced by any heteroatom and/or group selected from the group of —O—, —C(O)—, —C(O)O—, —S—, —S(O)—, SO$_2$—, —S(O)$_2$O—, —N═, —P═, —NR'—, —PR'—, —P(O)(OR')—, —P(O)(OR')O—, —P(O)(NR'R')—, —P(O)(NR'R')O—, P(O)(NR'R')NR'—, —S(O)NR'—, and —S(O)$_2$NR', with R' being H, a C1-C6 alkyl, optionally partially or totally perfluorinated, and/or a phenyl, optionally partially or totally perfluorinated.

For the purpose of the present invention, a totally unsaturated substituent also encompasses aromatic substituents.

Substituents R may be selected from H, C1-C20, preferably C2-C12 alkyls, C2-C20, preferably C2-C12 alkenyl- or alkynyl groups, saturated or non-saturated, including aromatic, C3-C7 cycloalkyl groups, NO$_2$, CN or halogens. Halogens may, however, only appear as substituents of carbons, not of heteroatoms. NO$_2$, and CN may not appear as substituents of a positively charged heteroatom; Furthermore, not all substituents may be NO$_2$, or CN, respectively, at the same time.

Substituents may be linked with each other pairwise to form bi- or polycyclic ring systems. The substituents may be substituted partially or totally with halogens, preferably F and/or Cl, or partially with CN or NO$_2$. They may further comprise one or two heteroatoms or groups selected from the group of O, C(O), C(O)O, S, S(O), SO$_2$, S(O)$_2$O, N, P, NH, PH, NR', PR', P(O)(OR'), P(O)(OR')O, P(O)(NR'R'), P(O)(NR'R')O, P(O)(NR'R')NR', S(O)NR', and S(O)$_2$NR'. In case of a total halogenation, however, not all substituents R may be totally halogenated, meaning that at least one halogen is not perhalogenated.

Without limiting the general scope of the invention, examples for substituents of the organic cation are —F, —Cl, —Br, —I, —CH3, —C2H5, —C3H7, —CH(CH3)2, —C4H9, —C(CH3)3, —C5H11, —C6H13, —C7H15, C8H17, —C9H19, —C10H21, —C12H25, —C20H41, —OCH3, —OCH(CH3)2, —CH2OCH3, —C2H4OCH(CH3)2, —SCH3, SCH(CH3)2, —C2H4C2H5, —C2H4SCH(CH3)2, —S(O)CH3, —SO2CH3, —SO2C2H5, —SO2C3H7, —SO2CH(CH3)2, —CH2SO2CH3, —OSO2CH3, —OSO2CF3, —CH2N(H)C2H5, C2H4N(H)C2H5, —CH2N(CH3)CH3, —C2H4N(CH3)CH3, —N(CH3)2, —N(CH3)C3H5, —N(CH3)CF3, O—C4H8-O—C4H9, —S—C2H4-N(C4H9)2, —OCF3, —S(O)CF3, —CF3, —C2F5, —C3F7, —C4F9, —C(CF3)3, —CF2SO2CF3, —C2F4N(C2F5)C2F5, —CF=CF, —C(CF3)=CFCF3, —CF2CF=CFCF3, —CF=CFN(CF3)CF3, —CFH2, —CH2CF3, —C2F2H3, —C3FH6, —CH2C3F7, —C(CFH2)3, —CHO, —C(O)OH, —CH2C(O)OH, —CH2C(O)CH3, —CH2C(O)C2H5, —CH2C(O)OCH3, —CH2C(O)C2H5, —C(O)CH3, —C(O)OCH3,

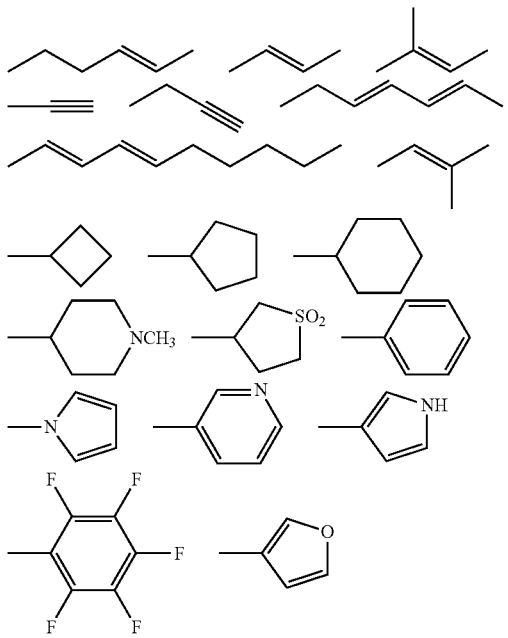

According to a preferred embodiment of the device of the invention, the organic cation Kt$^+$ is selected from the group

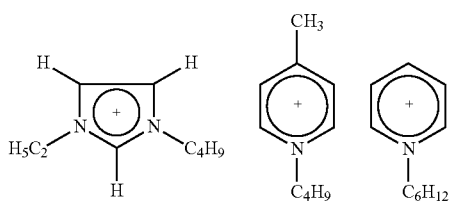

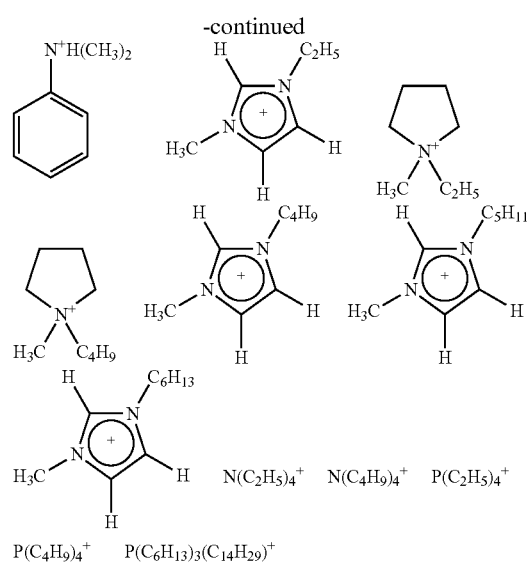

According to a preferred embodiment, the electrolyte of the present invention, and the electrolyte comprised in the device of the invention, comprises from 10-80 vol. % of the ionic liquid of formula (I). Preferably, the electrolyte comprises 15-50 vol. %, more preferably 20-45 vol. %, and most preferably 30-40 vol. % of the ionic liquid of formula (I). For the purpose of the present invention, percentages given in volume refer to the volume at 25° C. If a given compound or composition is not liquid at this temperature, the volume is measured at the lowest temperature at which volume can be determined, typically at the melting point of the compound or composition.

Other components of the electrolyte are one or several further ionic liquids, solvents, iodine and others, as indicated further below.

Preferably, if the electrolyte is a binary system comprising two ionic liquids, it comprises 90-20 vol. %, preferably 85-50 vol. %, more preferably 80-55 vol. %, and most preferably 70-60 vol-% of the further ionic liquid, in combination with the ionic liquid of formula (I) present at the respective amounts indicated above. The percentages in this paragraph in combination with the percentages of the ionic liquid of formula (I) above are thus expressed with respect to the total of ionic liquids (=100 vol. %) present in the electrolyte. Amounts of further, generally optional components indicated below, such as N-containing compounds having unshared electron pairs, Iodine, solvents, polymers, and nanoparticles, for example, are not considered therein.

Binary systems comprising two ionic liquids at the percentages indicated above were shown to be particularly advantageous. These electrolytes exhibit maximum short circuit current and photovoltaic conversion efficiency in dye sensitised solar cells.

According to a preferred embodiment, the electrolyte of the present invention comprises an ionic liquid of formula I and at least one further, ionic liquid. Similarly, the electrolyte of the device of the present invention, in a preferred embodiment, comprises a further ionic liquid. Electrolytes comprising a mixture of two ionic liquids are binary electrolytes, those comprising a mixture of three ionic liquids are ternary electrolytes. The present invention thus includes binary and ternary electrolytes, for example, and those having still more ionic liquids.

According to a preferred embodiment of the electrolyte of the present invention, the at least one further ionic liquid comprises a redox-active anion, a redox-active cation, or both. Redox-active ions, for the purpose of the present invention, are ions that can undergo a oxidation and/or reduction reaction at an electrode.

According to a preferred embodiment of the present invention, the electrolyte comprises a further ionic liquid with iodide as an anion. The cation of the further ionic liquid may be selected amongst organic compounds comprising a quaternary nitrogen atom, preferably cyclic organic compounds. For example, the cation of the ionic liquid may be selected from the organic cations disclosed above, including $Kt^+$ in formula (I), or from pyridinium salts, imidazolium salts, triazolium salts, which may be substituted, for example as disclosed in EP 1180774A2.

Cations of the at least one further ionic liquid, when the anion is redox-active, may be selected from cations shown in EP 0 986 079 A2, starting on page 12 and ending on page 21, line 30. The cations shown on these pages are incorporated herein by reference.

Preferred cations of the further ionic liquid are imidazolium ions substituted at N1 and/or N3. Substituents may be selected, independently of each other (if two are present), from alkyl, alkoxyl, alkenyl, alkynyl, alkoxyalkyl, polyether, and aryl, for example phenyl. Any of the substituents includes 1 to 20, preferably 1 to 10 carbons and may be linear, cyclic and/or branched, and may comprise one or more heteroatoms, wherein said substituents may be further substituted.

Preferred imidazolium-based cations of the further ionic liquids, if the anion is redox-active, are imidazolium ions substituted with 1, 2 or more C1-C10, preferably C1-C6-alkyl groups.

More preferably, the imidazolium ion is substituted twice, at the N1 and the N3 position.

Particularly preferred examples of further ionic liquid are 1-propyl-3-methylimidazolium iodide (PMII), 1-butyl-3-methylimidazolium iodide (BMII), 1-hexyl-3-methylimidazolium iodide (HMII).

Examples of further ionic liquids can be taken from the literature. For example, the molten salts disclosed in EP 1180774A2 starting on page 22, line 10 and ending on page 29, line 16, are expressly incorporated herein by reference.

Preferably, the further ionic liquid is a room temperature ionic liquid, meaning that it has a melting point at or below 25° C.

As indicated above, the present invention encompassed ternary ionic liquids.

Accordingly, the electrolyte of the invention or used in the device of the invention, in a preferred embodiment, comprises a still further ionic liquid with an anion selected from a halide ion, a polyhalide ion, a complex anion containing at least one halide ion $CF_3SO_3^-$, $CF_3COO^-$, $(CF_3SO_2)_2C-$, $NO_3^-$, $PF_6^-$, $BF_4^-$, $^-N(CN)_2$, $C(CN)_3$, $NCS^-$, $RSO_3^-$, and $R^1SO_4$ with $R^1$ selected from hydrogen and linear or branched alkyl or alkoxy groups, with 1 to 20 carbon atoms. Preferably, the halide ion is $I^-$. Other suitable anions of still further ionic liquids are equally disclosed at the text position of the above reference and are incorporated herein by reference.

The cation in the still further ionic liquid may be selected as indicated above for the further ionic liquid. Preferably, the still further ionic liquid has a melting point of $\leq 25°$ C.

The electrolyte used in the present invention preferably comprises iodine ($I_2$). Preferably, it comprises from 0.005 to 7 mol/dm³, more preferably from 0.01 to 6.5 mol/dm³ and most preferably from 0.05 to 6 mol/dm³ of $I_2$.

In a preferred embodiment, the electrolyte of the present invention, and as present in the device of the present invention, further comprises at least one compound containing a nitrogen atom having non-shared electron pairs. Preferably, this compound is not charged at pH 8.

Examples of such compounds are found in EP 0 986 079 A2, starting on page 2, lines 40-55, and again from page 3, lines 14 extending to page 7, line 54, which are expressly incorporated herein by reference.

Preferably, the compound comprising a nitrogen atom having non-shared electron pairs in a molecule is selected from those disclosed in EP 1 507 307 A1, page 5, line 27-29.

In general, preferred examples of compounds having an N-atom with unshared electrons are N-alkyl substituted benzoimidazoles. Preferably, the substituent is a C1-C6 alkyl, or a C6-C14 aryl, preferably an alkyl. Preferably the alkyl is selected from methyl, ethyl, propyl and butyl. Further substituents, for example alkyls or aryls may be present elsewhere and in particular on C2 position of the benzoimidazole.

Particularly preferred examples of compounds having non-shared electron pairs include N-methylbenzoimidazole (NMBI), N-ethylbenzimidazole, N-propylbenzimidazole, N-butylbenzimidazole, N-hexylbenzimidazole, 1-methyl-2-phenyl-benzoimidazole, and/or 1,2-dimethyl-benzoimidazole.

According to an embodiment, the electrolyte of the invention or present in the device of the present invention comprises less than 50 vol. % of an organic solvent. Preferably, the electrolyte comprises Less than 40%, more preferably less than 30%, still more preferably less than 20% and even less than 10%. Most preferably, the electrolyte comprises less than 5% of an organic solvent. For example, it is susbstantially free of an organic solvent. Percentages are indicated on the basis of volume at room temperature (RT=25° C.).

It is an important and unexpected advantage of the electrolyte of present invention that the amount of organic solvent can be reduced and even totally omitted. In sensitised solar cells, encapsulation, evaporation and leakage of organic solvents based electrolytes provide major problems and making commercial exploitation of these devices not yet feasible. Therefore, a number of efforts have been undertaken to replace the volatile organic solvent of the electrolyte. However, ionic liquids devoid of solvents are generally too viscous. With solid-state electrolytes, on the other hand, photovoltaic performance is not high enough to compete with the organic solvent-based electrolytes.

Organic solvents, if present in small amounts as indicated above, may be selected from those disclosed in the literature, for example in EP 0 986 079 A2, page 8, lines 34-49 and again on page 9, lines 1-33. Solvents are also disclosed in EP 1 180 774A2, page 29, lines 31-40. Preferred solvents, however, are those disclosed in EP 1 507 307 A1, page 5, lines 53-58, and page 6, lines 1-16. Preferably, the solvent is a alkoxyalkanenitrile solvent. Accordingly, the alkoxy group is a C1-C8, preferably C1-C4 alkoxy group and the alkane is a C1-C10 alkane, preferably a C2-C6 alkane. Preferably, the solvent, if present, is a C1-C4 alkoxy propionitrile, for example 3-methoxyproprionitrile.

If a solvent is present in the electrolyte of the invention and as comprised in the device of the present invention, there may further be comprised a polymer as gelling agent, wherein the polymer is polyvinyldenefluoride (PVDF), polyvinyledene-hexafluoropropylene (PVDF+HFP), polyvinyledene-hexafluoropropylene-chlorotrifluoroethylene (PVDF+HFP+CTFE) copolymers, nafion, polyethylene oxide, polymethylmethacrylate, polyacrylonitrile, polypropylene, polystyrene, polybutadiene, polyethyleneglycol, polyvinylpyrrolidone, polyaniline, polypyrrole, polythiophene and their derivatives, for example. The purpose of adding these polymers to the electrolytes is to make liquid electrolytes into quasi-solid or solid electrolytes, thus improving solvent retention, especially during aging.

The electrolyte of the invention and as comprised in the device of the present invention may further comprise metal oxide nanoparticles like $SiO_2$ or $TiO_2$ or $Al_2O_3$ or MgO or ZnO, for example, which are also capable of increasing solidity and thus solvent retention.

In a preferred embodiment of the present invention, the electrochemical and/or the optoelectronic device is a photovoltaic cell, an electrochemical battery, for example a lithium ion battery and/or a capacitor, a light emitting device, an electrochromic or photo-electrochromic device, an electrochemical sensor and/or biosensor. The electrochemical device may be an electrochemical display or an electrochemical capacitor, for example a super capacitor. The capacitor may be a double layer capacitor.

With respect to electrochromic and/or photoelectrochromic devices, the present invention relates, according to a particular embodiment, to electrochemical devices such as those disclosed in U.S. Pat. No. 6,426,827, modified in that the electrolyte of the devices of this reference comprises the ionic liquid as defined in the present invention. Accordingly, the present invention encompasses systems comprising at least two electrodes, any one of which may be transparent or opaque, and at least one of which changes colour depending on (I) the voltage applied between the two electrodes, (II) the intensity of light to which the system is exposed; (III) the combined influence of (I) and (II). Further sub-classes of electrochromic systems, disclosed in this reference, which is entirely incorporated herein by reference, are also encompassed by the devices of the present invention. Examples are the various electrochromic, dynamic photoelectrochromic and persistent photoelectrochromic systems disclosed in this reference.

In a further preferred embodiment, the device is a dye or quantum dot sensitised solar cell. Quantum dot sensitised solar cells are disclosed in U.S. Pat. No. 6,861,722, for example. In dye-sensitized solar cells, a dye is used to absorb the sunlight to convert into the electrical energy. Examples of dyes are disclosed in EP 0 986 079 A2, EP 1 180 774A2, and EP 1 507 307 A1.

According to a preferred embodiment, if the device of the present invention is a solar cell, it comprises a semiconductor, the electrolyte according to claims 1-8, and a counter electrode. According to a preferred embodiment of the invention, the semiconductor is based on material selected from the group of Si, TiO2, SnO2, Fe2O3, WO3, ZnO, Nb2O5, CdS, ZnS, PbS, Bi2S3, CdSe, GaP, InP, GaAs, CdTe, CuInS2, and/or CuInSe2. Preferably, the semiconductor comprises a mesoporous surface, thus increasing the surface optionally covered by a dye and being in contact with the electrolyte. Preferably, the semiconductor is present on a glass support or plastic or metal foil. Preferably, the support is conductive.

The device of the present invention preferably comprises a counter electrode. For example, fluorine doped tin oxide or tin doped indium oxide on glass (FTO- or ITO-glass, respectively) coated with Pt or carbon or poly (3,4-ethylenedioxythiophene) (PEDOT).

The device of the present invention may be manufactured as the corresponding device of the prior art by simply replacing the electrolyte by the electrolyte of the present invention. For example, in the case of dye-sensitised solar cells, device assembly is disclosed in numerous patent literature, for example WO91/16719 (examples 34 and 35), but also scientific literature, for example in Barbé C. J., Arendse, F.; Comte, P., Jirousek, M., Lenzmann, F., Shklover, V., Grätzel, M. J. Am. Ceram. Soc. 1997, 80, 3157; and Wang, P., Zakeeruddin, S. M., Comte, P., Charvet, R., Humphry-Baker, R., Grätzel, M. J. Phys. Chem. B 2003, 107, 14336.

Preferably, the sensitized semiconducting material serves as a photoanode. Preferably, the counter electrode is a cathode.

The present invention provides a method for preparing a photoelectric cell comprising the step of bringing the ionic liquid of the invention in contact with a surface of a semiconductor, said surface optionally being coated with a sensitiser. Preferably, the semiconductor is selected from the materials given above, and the sensitiser is preferably selected from quantum dots and/or a dye as disclosed above.

Preferably, the ionic liquid is applied in the form of the electrolyte of the present invention. It may simply be poured on the semiconductor. Preferably, it is applied to the otherwise completed device already comprising a counter electrode by creating a vacuum in the internal lumen of the cell through a hole in the counter electrode and adding the electrolyte as disclosed in the reference of Wang, P et al. J. Phys. Chem. B 2003, 107, 14336.

The present invention will now be illustrated, without limiting its scope, by way of the following examples.

EXAMPLES

Example 1

Ionic Liquids, Electrolytes and Diffusion Coefficient

A ionic liquid $EMIB(CN)_4$ (1-ethyl-3-methylimidazolium tetracyanoborate) was obtained from Merck, Germany. Its synthesis is further disclosed in WO 2004/072089, page 18, Example 9. The viscosity of $EMIB(CN)_4$ is 19.8 cP at 20° C.

A binary ionic liquid, "electrolyte A" was composed of 0.2 M $I_2$, 0.5 M NMBI (N-Methylbenzimidazole) and 0.1 M guanidinium thiocyanate (GuNCS) in a mixture of PMII (1-methyl-3-propylimidazolium) iodide and $EMIB(CN)_4$ (volume ratio: 13:7). PMII was prepared according to Bonhôte, P. et al Inorg. Chem. 1996, 35, 1168-1178.

For comparison, another binary ionic liquid electrolyte B was prepared using 0.2 M $I_2$, 0.5 NMBI and 0.1 M GuNCS in PMII.

The diffusion coefficients of iodide and triiodide were measured as described in Bard, A. J.; Faulkner, L. R. *Electrochemical Methods: Fundamentals and Applications*, 2nd ed: Weinheim, 2001. The apparent diffusion coefficient of iodide and triiodide calculated from the equation $I_{ss}=4ncaFD_{app}$ are $4.08 \times 10^{-7}$ $cm^{-2}$ $s^{-1}$ and $3.42 \times 10^{-7}$ $cm^{-2}$ $s^{-1}$, respectively. The diffusion coefficient of triiodide is 1.8 times higher than that in pure PMII based electrolyte. It is hypothesized that this is due to the lower viscosity of the binary ionic liquid electrolyte A. The anodic and cathodic steady state currents ($I_{ss}$) of electrolyte A were measured with a Pt ultramicroelectrode, using a Pt foil as counter electrode. A stead-state voltammetry curve for electrolyte A at the scan rate of 20 $mVS^{-1}$ is shown in FIG. 1.

It can be seen that the electrolyte comprising tetracyanoborate and an organic cation has good electrolyte properties and comparatively high diffusion coefficients for iodide and triiodide.

Example 2

Fabrication of Dye-Sensitized Solar Cells

A double-layer, mesoporous $TiO_2$ electrode was prepared as disclosed in Wang, P., Zakeeruddin, S. M., Comte, P., Charvet, R., Humphry-Baker, R. Grätzel M., Enhance the Performance of Dye-Sensitized Solar Cells B Co-Grafting Amphiphilic Sensitizer and hexadecylmalonic Acid on $TiO_2$ Nanocrystals M. J. Phys. Chem. B 2003, 107, 14336, in particular page 14337, in order to obtain a photoanode consisting of a double layer structure, with a transparent layer (20 nm particle) and scattering layer (400 nm particle) of 6.8 µm and 4 µm thickness, respectively.

The electrode was sintered and coated with Z-907 Na dye by dipping it into the dye solution as disclosed in the same reference above (300 µM Z-907Na is disclosed in Wang Peng, Wenger B, Humphry-Baker R, Teuscher J, Kantlehr W, Mezger J, Stoyanov E:V, Zakeeruddin Shaik M and Graetzel M; Charge separation and efficient light energy conversion in sensized mesoscopic solar cells based on binary ionic liquids. J. Am. Chem. Soc, 2005, 127, 6850 in acetonitrile and tert-butyl alcohol, v:v=1:1) for 14 hours at room temperature.

The dye-sensitized solar cell was assembled as disclosed in the reference above with thermally platinized conducting glass electrodes, which electrodes were separated by a 35 µm thick Bynel hot-melt ring (DuPont, USA) and sealed up by heating. The internal space was filled with electrolyte A and electrolyte B using a vacuum pump to produce device A and B, respectively. The electrolyte-injecting hole made with a sandblasting drill on the counter electrode glass substrate was sealed with a Bynel sheet and a thin glass cover by heating.

Example 3

Characteristics of the Dye-Sensitized Solar Cells

The measurement of current-voltage curves and incident photon-to-current conversion efficiency (IPCE) of the cells were obtained by using a Keithley model 2400 digital source meter (Keithley, USA) under an applied external potential bias as reported in the reference cited above of Wang et al J. Phys. Chem. B 2003, 107, 14336.

Figure 2:
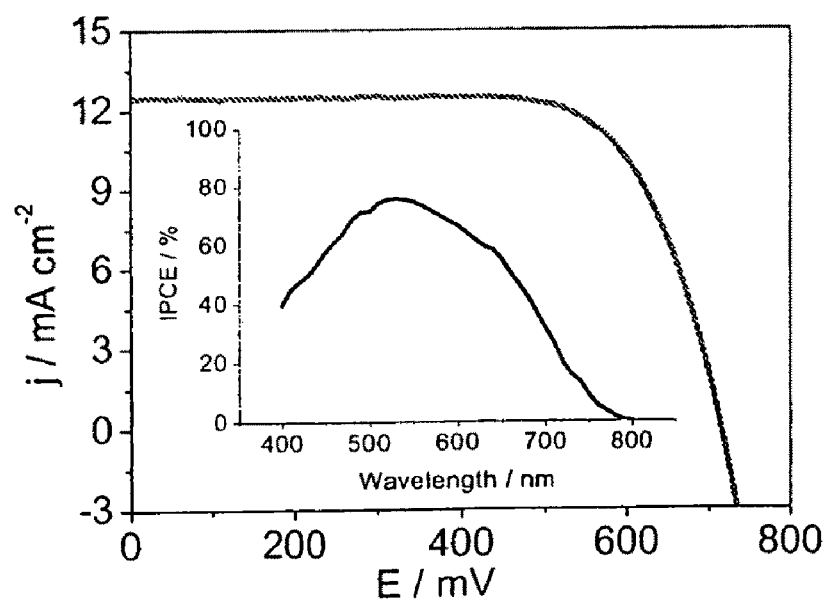
FIG. 2 shows the current density-voltage characteristics of a dye-sensitised solar cell under AM-1.5 full sunlight illumination (100 mW $cm^{-2}$) with Z907Na in combination with electrolyte A. The inset shows the incident photon-to-current conversion efficiency as a function of wavelength of the exciting light.

The photocurrent-voltage curves of devices A based on Z-907Na sensitizer and electrolyte A measured under AM-1.5 full sunlight illumination is shown in FIG. 2.

The photocurrent action spectrum of devices A (inset of FIG. 2) shows that the incident photon to current conversion efficiency (IPCE) is close to 80% at 530 nm. Detailed photovoltaic conversion efficiencies of devices A and B at various light intensities are shown in Table 1 below.

TABLE 1

Photovoltaic parameters of devices A and B at different light intensities

| Electrolyte | η (%) at different light intensity | | |
|---|---|---|---|
| | 1.0 sun | 0.5 sun | 0.3 sun |
| A | 6.4 | 7.1 | 7.3 |
| B | 5.8 | 6.3 | 6.5 |

At the lower light irradiance of 50 and 30 mW $cm^{-2}$ and room temperature, the device A photovoltaic conversion efficiencies are 7.1% and 7.3%, respectively.

Device A with electrolyte A was generally found to give higher photocurrent density and superior conversion efficiency than the device with electrolyte B (Table 1). These improved values may be explained, without wishing to be bound by theory, by the low viscosity of electrolyte A.

Detailed photovoltaic parameters of device A at AM-1.5 full sunlight illumination conditions but different temperatures are shown in Table 2 below. These parameters are the short-circuit photocurrent density ($J_{sc}$), the fill factor (FF), the open-circuit photovoltage ($V_{oc}$), and the photovoltaic conversion efficiency (η).

TABLE 2

Photovoltaic parameters of device A at different temperatures

| Temperature | $J_{sc}$ | FF | $V_{oc}$ | η |
|---|---|---|---|---|
| RT (25° C.) | 12.70 | 0.704 | 715.9 | 6.40 |
| 40° C. | 13.11 | 0.721 | 678.2 | 6.42 |
| 60° C. | 13.33 | 0.716 | 644.5 | 6.15 |
| 80° C. | 13.06 | 0.709 | 623.1 | 5.77 |

Example 4

Long Term Stability of the Electrochemical Device of the Present Invention

Dye-sensitized devices prepared as device A above based on the amiphiphilic dye (Z907Na) and electrolyte A containing $EMIB(CN)_4$ were subjected for the long-term stability investigation at high temperature (80° C.) in dark and light soaking at 60° C.

Solar cells were aged at 80° C. in dark. Before each measurement of the aged cell, the cells were illuminated under visible light (AM 1.5) at 60° C. for 1 h.

Figure 3:
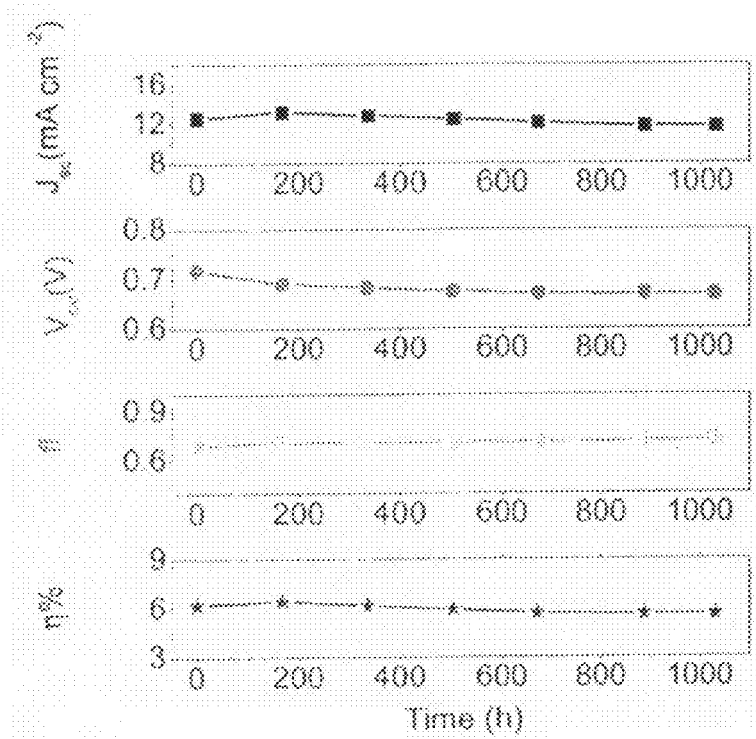
FIG. 3 shows the evolution of photovoltaic parameters (AM-1.5 full sunlight) of the device during continued thermal aging at 80° C. in the dark.

Detailed results of these parameters ($J_{sc}$, $V_{oc}$, FF, η) during the aging at 80° C. in dark are shown in FIG. 3. It can be seen that the fill factor increases during the aging process, which may be attributed to a better electro-catalytic activity of Pt or contact between electrolyte and counter electrode. During the thermal aging there was a drop in the short-circuit current density and the open-circuit voltage of 1 mA $cm^{-2}$ and 50 mV, respectively. These losses were compensated partially with 5% increase in the FF and consequently the overall photovoltaic efficiency of device A retained more than 90% of the initial value even after 1000 h aging at 80° C. This is the first time that such an excellent stability of dye-sensitised solar cells with binary ionic liquid electrolyte exposed to 80° C. for prolonged time has been obtained.

These results are likely to foster scientific research and industrial applications of optoelectronic and/or electrochemical devices, especially those where one can use only ionic liquid electrolytes.

Figure 5:
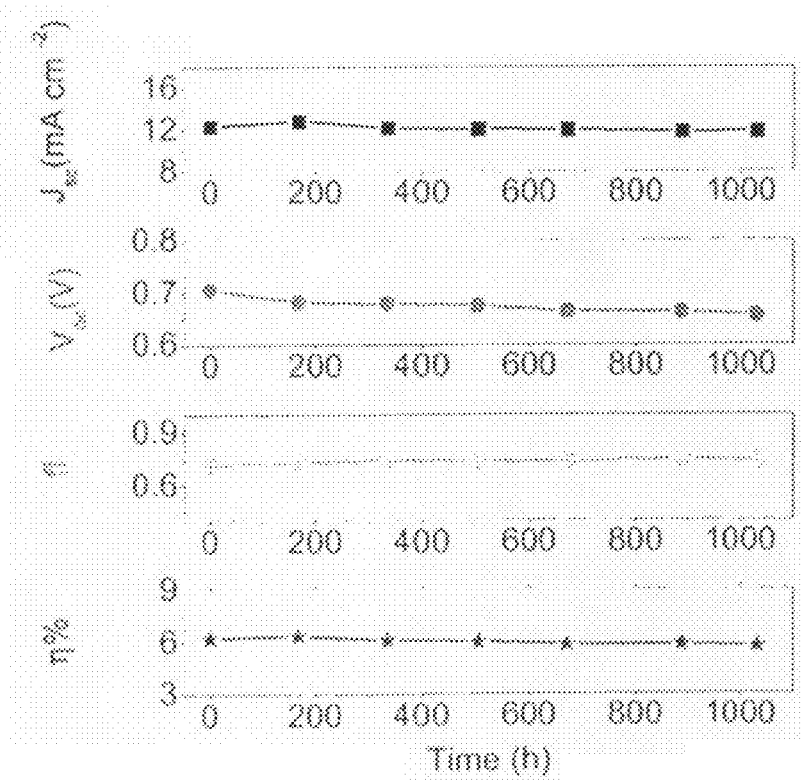
FIG. 5 shows the evolution of photovoltaic parameters (AM-1.5 full sunlight) of the device during continued one sun visible-light soaking at 60° C.

Additionally, devices A were submitted to an accelerated test in a solar simulator at 100 mW$cm^{-2}$ at 60° C. The cells were covered with a 50 µm thick layer of polyester film as a UV cut-off filter (up to 400 nm). As can be seen in FIG. 5, there is a small drop in the short-circuit current density (0.55 mA $cm^{-2}$) and open-circuit voltage (50 mV) during light soaking with an improvement in the FF (5%).

All in all, the device exhibited excellent photo-stability when exposed to 60° C. for a prolonged time: the device photovoltaic conversion efficiency retained more than 90% stability of initial value, even after 1000 h under light soaking at 60° C.

Example 5

Electrochemical Impedance Spectroscopy (EIS)

EIS was performed according to the procedures disclosed in Bisquert, J. Phys. Chem. Chem. Phys. 2003, 5, 5360; Fabregat-Santiago, F., Bisquert, J., Garcia-Belmonte, G., Boschloo, G., Hagfeldt, A. Solar Energy Materials & Solar Cells 2005, 87, 117; and Wang, Q, Moser, J. E., Grätzel, M. J. Phys. Chem. B. 2005, 109, 14945.

Figure 4:
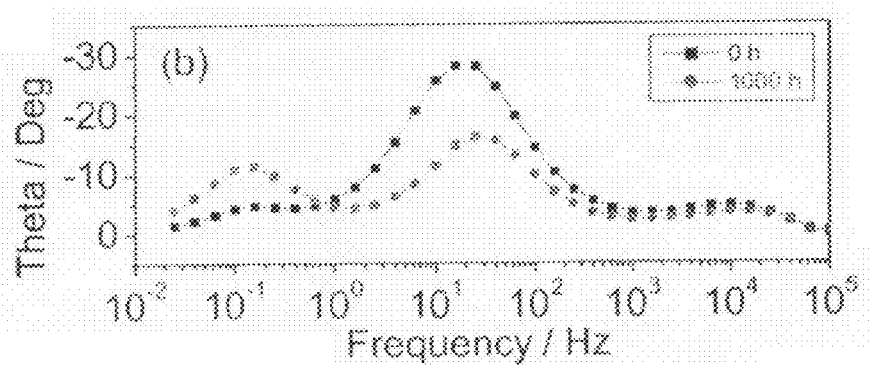
FIG. 4 shows (A) The Nyquist plots and (B) Bode phase plots of the device for fresh and aging cell at 80° C. for 1000 h, measured at −0.7 V bias in dark.
Figure 4:
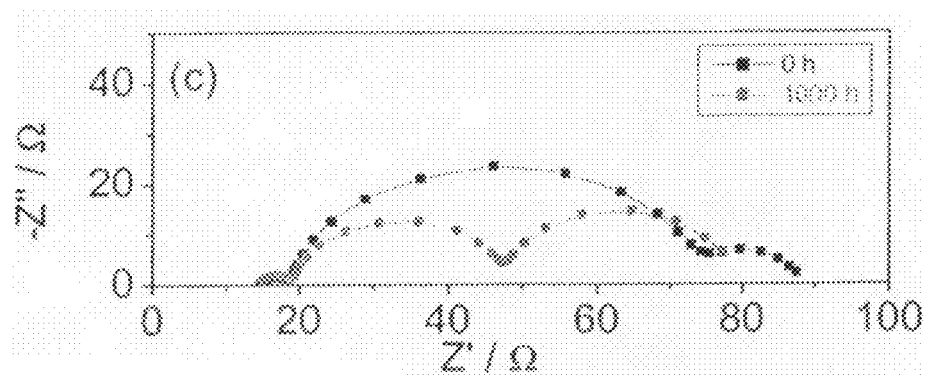

EIS permits to investigate the photo electrochemical interface variation in order to understand the photovoltaic parameter variations during the aging processes of the solar cells of Example 2. A typical EIS spectrum exhibits three semicircles in the Nyquist plot or three characteristic frequency peaks in a Bode phase angle presentation as indicated in FIG. 4. In the order of increasing frequency the features are attributed to the Nernst diffusion in electrolyte, electron transfer at $TiO_2$/electrolyte interface and redox charge transfer at the counter electrode, respectively. FIGS. 4A and 4B show the Nyquist plots and Bode phase of device A before and after the aging at 80° C. for 1000 h measured in dark at −0.70 V bias. It is apparent that the middle frequency peak position slightly shifts to high frequency (FIG. 4B), which revealed that there is a decrease in electron response time ($\tau$) after aging, compared with a freshly prepared cell. Change in the electron responding time is in accordance with a drop of $V_{oc}$ by 50 mV during the thermal aging of cells.

The EIS data of the freshly prepared and the aged cells confirmed that the interface of $TiO_2$/dye/electrolyte and Pt/electrolyte exhibit good stability, which are responsible for obtaining stable photovoltaic performance.

Example 6

Optimization of Electrolyte

In order to determine the optimal amount of the compound of formula (I) in the electrolyte of the present invention, the volume ratio of ionic liquids in electrolyte A of Example 1 was varied and photovoltaic parameters of variants were analysed as above.

FIGS. 6A and B show, on the x-axis, the varying ratio of PMII in a binary electrolyte, with the remaining volume being provided by $EMIB(CN)_4$ to make up 100 vol. %. Further components are present as indicated in electrolyte A in Example 1.

The FIGS. 6A and B show, respectively, that short circuit current and conversion efficiency are at an optimum value with PMII at about 65 vol. %, and $EMIB(CN)_4$ thus at about 35 vol. % in the binary electrolyte.

Example 7

Electrochromic Device (1)

In this example, a transparent electrochromic device for the control of light transmission with an external current-voltage source is prepared.

The device comprises two parallel and transparent electrodes, of which the respective supports are from a conductive glass plate, covered with doped tin oxide and connected to an external electric circuit by means of contacts.

The electrochromic device is prepared following U.S. Pat. No. 6,426,2827, on conductive glass of SnO2, with a cathode made of nanocrystalline titanium dioxide, 7 μm thick, comprising a monolayer of N-methyl-N'-(3-propylphosphonate)-bipyridinium. The anode is made of colourless electrochemically coated poly-ferrocyanide iron(II), the latter being electrodeposited according to the method described by Itaya, Ataka, and Toshima in *J. Am. Chem. Soc.* 1982, 104, 4767.

The space between the two electrodes, 30 μm, is filled with a solution consisting of 1-methyl-3-ethylimidazolium tetracyanoborate. The cell is sealed by a heat-fusible polymer. When a voltage of 1 V is applied between the electrodes, the absorbance of the system at 600 nm passes from 0 to 1.5 in 2 seconds, the appearance changing from transparent colourless to deep blue. The process is reversible in the same interval of time.

Example 8

Electrochromic Device (2)

A further electrochromic device is prepared with the cathode being formed of nanocrystalline titanium dioxide 7 μm thick, coated onto the face located inside the electrochromic cell, with a layer of microcrystalline titanium dioxide in opaque and white rutile form. The anode is formed from a zinc plate. The solution between the electrodes contains zinc chloride in a concentration of 0.2 M in 1-methyl-3-ethylimidazolium tetracyanoborate. The system passes from a white appearance, by reflection, to a blue appearance, by reflection, in 2 seconds when the voltage applied between the electrodes rises from 0 to 1 V. The process is reversible in the same period of time. If the two electrodes are connected in short-circuit, the system becomes blue, the most thermodynamically stable state, with the zinc oxidoreduction potential being lower than that of the viologen electrochromophoric group under these conditions. Whether the system is in the coloured or colourless state, this state will persist for several hours when the circuit is open.

Examples 7 and 8 thus show the use of compounds of formula (I), namely 1-methyl-3-ethylimidazolium tetracyanoborate in electrochromic devices.

Example 9

Electric Double Layer Capacitor

An electric double layer capacitor is prepared according to example 1 of U.S. Pat. No. 7,110,243, wherein an electrolyte of 50 vol % 1-methyl-3-ethylimidazolium tetracyanoborate and 50 vol. % a acetonitrile solvent is used instead of the propylene carbonate and γ-butyrolactone-based electrolyte used in said example. The structure of such a double layer capacitor is shown in FIG. 1 of U.S. Pat. No. 7,110,243. A functional capacitor is obtained.

The invention claimed is:

1. A dye or quantum dot sensitized photoelectrochemical and device comprising an electrolyte comprising an ionic liquid of formula (I), $$Kt^+[B(CN)_4]^- \qquad (I),$$

in which $Kt^+$ is an organic cation;

a further ionic liquid with iodide as an anion;

and added iodine ($I_2$).

2. The device of claim 1, in which the organic cation $Kt^+$ is a hydrocarbon comprising at least one charged atom selected from the group of $N^+$, $P^+$, $C^+$, $S^+$, and combinations thereof, the hydrocarbon optionally being substituted and optionally comprising one or several hetero atoms.

3. The device of claim 1, in which $Kt^+$ of the ionic liquid is selected from the group

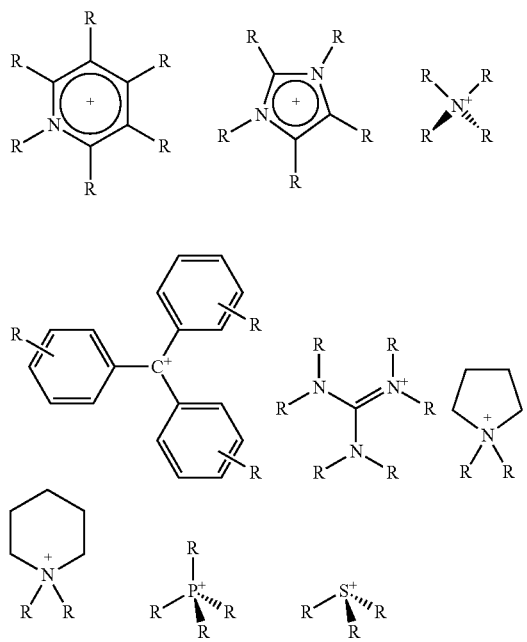

with R being:
- H, provided that at least one R linked to a heteroatom is different from H;
- a linear or branched C1-C20 alkyl;
- a linear or branched C2-C20 alkenyl, comprising one or several double bonds;
- a linear or branched C2-C20 alkynyl, comprising one or several triple bonds;
- a saturated, partially or totally unsaturated. C3-C7 cycloalkyl;
- a halogen, preferably fluoride or chloride, provided that there is no halogen-heteroatom bond;
- $NO_2$, provided that there is no bond of this group with a positively charged heteroatom, and that at least one R is different from $NO_2$;
- CN, provided that there is no bond of this group with a positively charged heteroatom and that at least one R is different from CN;
- wherein the R may be the same or different;
- wherein pairs of R may be connected by single or double bonds;
- wherein one or several R may be partially or totally substituted with halogens, preferably —F and/or —Cl, or partially with —CN or —$NO_2$, provided that not all R are totally halogenated;
- and wherein one or two carbon atoms of any R may or may not be replaced by any heteroatom and/or group selected from the group of —O—, —C(O)—, —C(O)O—, —S—, —S(O)—, $SO_2$—, —S(O)$_2$O—, —N═, —P═, —NR'—, —PR'—, —P(O)(OR')—, —P(O)(OR')O—, —P(O)(NR'R')—, —P(O)(NR'R')O—, P(O)(NR'R')NR'—, —S(O)NR'—, and —S(O)$_2$NR', with R' being H, a C1-C6 alkyl, optionally partially or totally perfluorinated, and/or a phenyl, optionally partially or totally perfluorinated.

4. The device according to claim 1, in which the organic cation Kt$^+$ is selected from the group

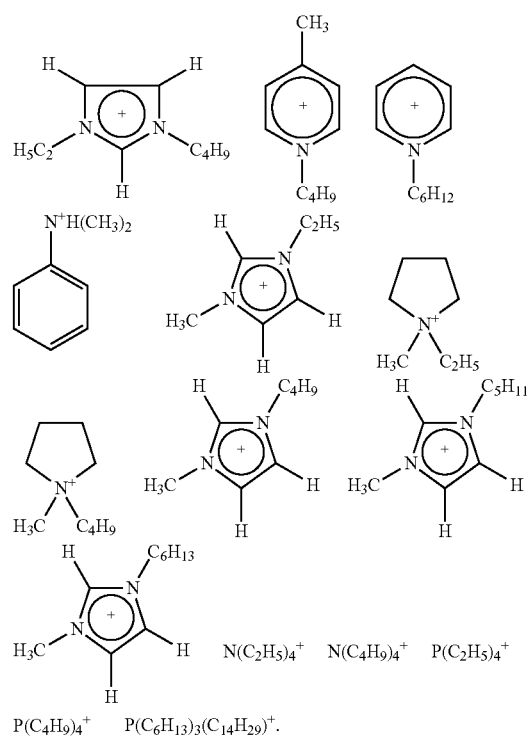

5. The device according to claim 1, in which the electrolyte further comprises at least one compound containing a nitrogen atom having one or more non-shared electron pairs.

6. The device according to claim 1, which is a dye or quantum dot sensitised solar cell.

7. The sensitised solar cell of claim 6, comprising a semiconductor, said electrolyte and a counter electrode.

8. The sensitised solar cell of claim 6, comprising a semiconductor based on material selected from the group of Si, TiO2, SnO2, Fe2O3, WO3, ZnO, Nb2O5, CdS, ZnS, PbS, Bi2S3, CdSe, GaP, InP, GaAs, CdTe, CuInS2, and/or CuInSe2.

9. The device according to claim 1, in which said further ionic liquid with iodide as an anion has an organic cation selected from the group of pyridinium, triazolium, imidazolium, which may be further substituted.

10. The device according to claim 9, in which said organic cation is an imidazolium substituted with 1, 2 or more C1-C20 alkyl groups.

11. The device according to claim 9, in which further ionic liquid with iodide as an anion is selected from the group of 1-propyl-3-m3thylimidqzolium iodide (PMII), 1-butyl-3-methylimidazolium iodide (BMII), 1-hexyl-3-methylimidzolium iodide (HMII).

12. An electrolyte comprising an ionic liquid of formula (I)

$$Kt^+[B(CN)_4]^- \qquad (I),$$

in which Kt$^+$ is an organic cation,
and at least one further ionic liquid comprising a redox-active anion and an N-substituted imidazolium ion as a cation.

13. The electrolyte of claim 12, wherein the at least one further ionic liquid comprises iodide (I$^-$) as an anion.

14. The electrolyte of claim 12, wherein the N-substituted imidazolium ion is an N-alkyl imidazolium ion.

15. The electrolyte according to claim 12, comprising from 10 to 80 vol. % of the ionic liquid of formula (I).

16. A method of preparing a photoelectric cell, the method comprising a step of bringing an electrolyte comprising an ionic liquid of formula (I), $$Kt^+[B(CN)_4]^- \qquad (I),$$

in which $Kt^+$ is an organic cation, at least one further ionic liquid and added iodine ($I_2$) in contact with a surface of a semiconductor, said surface optionally being coated with a sensitiser.

17. The method of claim 16, in which the electrolyte further comprises at least one compound containing a nitrogen atom having one or more non-shared electron pairs.

* * * * *

UNITED STATES PATENT AND TRADEMARK OFFICE
CERTIFICATE OF CORRECTION

| | | |
|---|---|---|
| PATENT NO. | : 8,114,318 B2 | Page 1 of 1 |
| APPLICATION NO. | : 12/223937 | |
| DATED | : February 14, 2012 | |
| INVENTOR(S) | : Kuang et al. | |

It is certified that error appears in the above-identified patent and that said Letters Patent is hereby corrected as shown below:

- column 14, claim 1, line 52, "and" should be deleted.

Signed and Sealed this
Third Day of April, 2012

David J. Kappos
*Director of the United States Patent and Trademark Office*